(12) United States Patent
Kirkpatrick

(10) Patent No.: US 6,448,740 B1
(45) Date of Patent: Sep. 10, 2002

(54) SYSTEM AND METHOD TO CHARGE ELECTRIC-POWERED VEHICLE USING LIGHT ENERGY

(75) Inventor: Mark A. Kirkpatrick, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/949,991

(22) Filed: Sep. 12, 2001

(51) Int. Cl.[7] .............................................. H01M 10/44
(52) U.S. Cl. ....................................... 320/101; 320/104
(58) Field of Search ................................. 320/101, 104, 320/138, 137; 136/251, 291, 246; 323/906

(56) References Cited

U.S. PATENT DOCUMENTS

| | | | | |
|---|---|---|---|---|
| 5,156,568 A | * | 10/1992 | Ricci | 454/129 |
| 5,228,925 A | * | 7/1993 | Nath et al. | 136/251 |
| 5,489,002 A | * | 2/1996 | Streiff | 180/220 |
| 5,570,000 A | * | 10/1996 | Kowalski | 322/1 |
| 5,839,816 A | * | 11/1998 | Varga et al. | 362/183 |
| 5,897,156 A | * | 4/1999 | Hayard et al. | 296/136 |
| 5,905,356 A | * | 5/1999 | Wells | 320/101 |

* cited by examiner

Primary Examiner—Edward H. Tso
Assistant Examiner—Lawrence Luk
(74) Attorney, Agent, or Firm—Shaw Pittman LLP

(57) ABSTRACT

A system for and method of charging a battery of an electric-powered vehicle is disclosed. The system utilizes a light-transforming cell that can transform light energy to current. The cell is supported by a support material positioned either inside or outside of the vehicle such that the cell may be exposed to light energy. Current produced by the cell is provided to the battery through electrical connectors, which may have a switch. This invention allows an electric-powered vehicle to be charged whenever there is sufficient light to allow energy-converting cells to convert light energy to electric current.

47 Claims, 5 Drawing Sheets

SYSTEM AND METHOD TO CHARGE ELECTRIC-POWERED VEHICLE USING LIGHT ENERGY

BACKGROUND

1. Field of the Invention

The present invention is directed to a system for and method of charging a battery using light energy. More particularly, the present invention is directed to a system for and method of charging a battery of an electric-powered vehicle using light energy.

2. Background of the Invention

A common electric-powered automobile typically uses one or more rechargeable batteries. The rechargeable batteries typically may be charged via a charging power station that converts 120-volt alternating current (AC) electricity into direct current (DC). These charging power stations usually are limited in availability and may only be found in select locations. Thus, the geographical limitations of power station availability make it burdensome for an operator of such an electric-powered automobile to charge the battery when necessary.

Furthermore, several hours may be needed to fully charge the rechargeable batteries of an electric-powered automobile. Thus, an operator may need to leave an electric-powered automobile stationary for long periods of time in order to let the batteries charge completely.

In contrast, conventional gasoline stations used for providing gasoline to gasoline-powered vehicles typically have short wait times for vehicles, only requiring a few minutes to completely fill a gas tank of a conventional gasoline-powered vehicle with gasoline. Thus, gasoline-powered vehicles have the advantage of numerous locations of gasoline fill stations, and the relatively short time required to completely fill a gasoline tank.

However, power stations for charging electric-powered automobiles are not designed for such a "quick fill". Typically, several hours are required to completely recharge an electric-powered automobile. A current recommended minimum charge time for conventional commercially available electric-powered vehicles is about 6.5 hours. Therefore, an alternative charge source, other than the above-described power stations for electric-powered automobiles, is desirable.

Furthermore, it would be desirable for an alternative charge source to be used at multiple locations, other than designated charge stations, thereby giving an operator of an electric-powered vehicle multiple choices of locations to use to charge the battery of vehicle. It would further be desirable to be able to use the charge source for an electric-powered vehicle at as many convenient places as possible, for example, at home or at work.

Finally, it would also be desirable to perform charging of an electric-powered vehicle using resources that do not harm the environment or result in high expense to an operator or owner of the vehicle. It would further be desirable to use a charge source that does not deplete any of the earth's natural resources and, instead, uses energy from an inexhaustible source, such as the sun.

SUMMARY OF THE INVENTION

The present invention is a system and method for charging a battery of an electric-powered vehicle. The system comprises a light-energy transforming cell, such as a photovoltaic cell, that can convert light energy incident upon the cell into electric current. The cell is connectable to a battery of an electric-powered vehicle through a conventional electrical connector. The cell may be supported by a support structure, such as a portable sunshade, that may be positioned inside of the vehicle, where the support structure can be protected from theft or damage from external factors. Alternatively, the cell may be supported by a support structure, such as a vehicle cover, that may be positioned outside of the vehicle, where the support structure may not be integral with the vehicle and is attachable to the vehicle through electrical connecting means.

Exemplary embodiments of other support structures, either inside of the vehicle or outside of the vehicle, used for supporting the cells, are possible, and are described below. During use, light from an ambient source that reaches the cell induces the cell to convert light energy into electric current, which is carried by the electrical connector to the battery of the electric-powered vehicle, thereby charging the battery.

The present invention addresses and overcomes the drawbacks of having to recharge a battery of an electric-powered vehicle for extended periods of time at designated power stations.

Thus, the present invention provides numerous advantages, not the least of which is that charging of a battery of an electric-powered vehicle may be performed at virtually any location with a sufficient light source, including at an owner's home or office, using a charging system that is positioned either inside or outside of the vehicle.

It is therefore an object of the present invention to provide a system for using light energy to charge a battery of an electric-powered vehicle.

It is another object of the present invention to provide a system that is easy to install and operate, and economical to use.

It is another object of the present invention to provide a system that may be used anywhere there is a sufficient light source to activate the energy transforming cells into creating electric current.

It is yet another object of the present invention to provide a method that is easy to follow and requires minimal steps to implement.

It is a further advantage of the present system to provide a method for using light energy to charge a battery of an electric-powered vehicle.

It is another object of the present invention to use solar energy as a light source to recharge the battery of an electric-powered vehicle.

These and other objects of the present invention will become apparent upon a reading of the following detailed description in conjunction with the accompanying drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
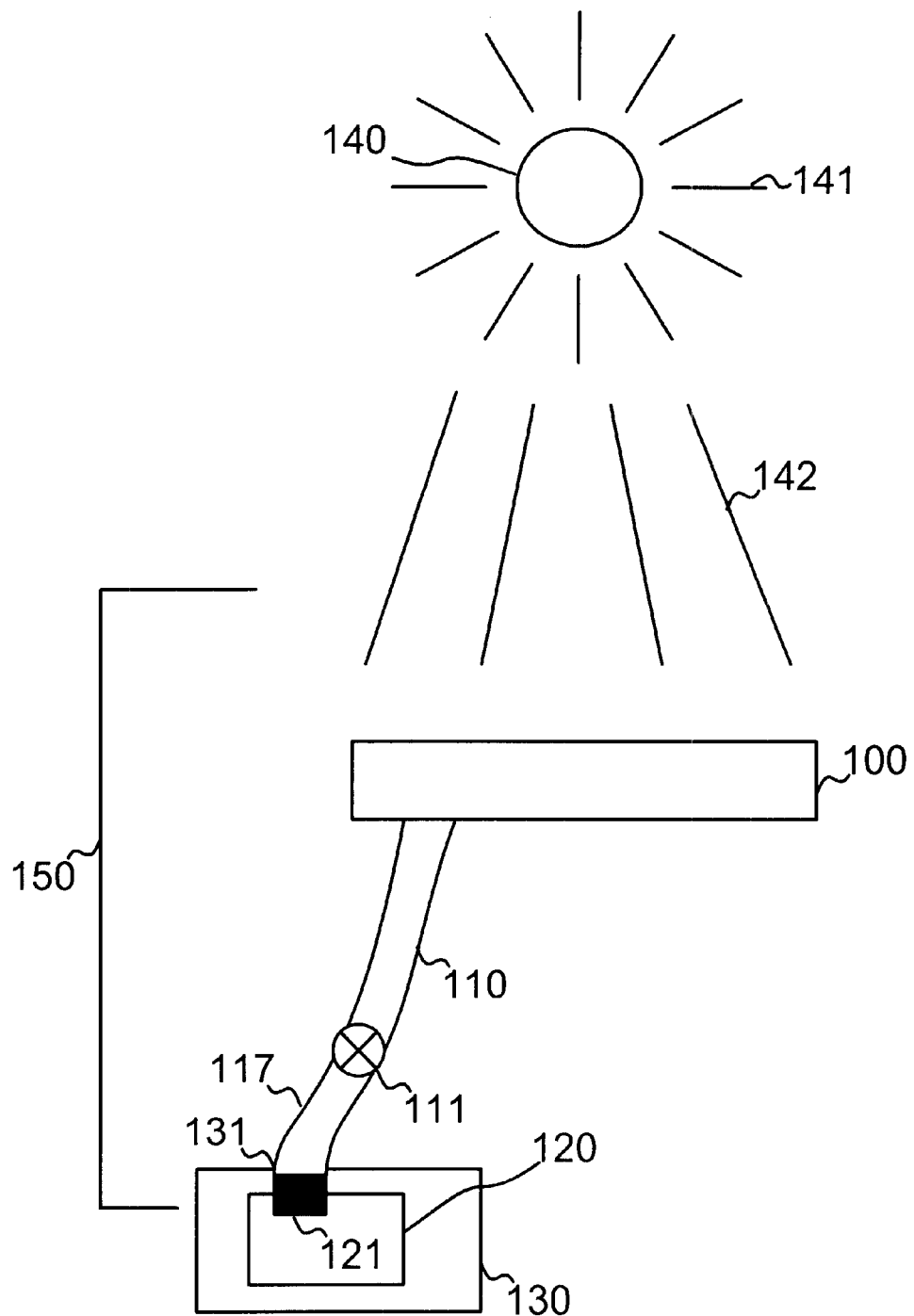
FIG. 1 is a schematic diagram of an exemplary system for charging a battery of an electric-powered vehicle.

Throughout this disclosure, the term "vehicle" is used to generally describe any machine, typically used for transport, that attains substantial power for transport through an electric power source, such as, for example, a battery. As used herein, "substantial power" in reference to the electric power source means that without the electric power source, the vehicle would not be operable for its intended purpose. Typical vehicles may include, but are not limited to having, a designated space for an operator, such as a driver or conductor. Such vehicles may include, but are not limited to, automobiles, trucks, buses, tractors, dune buggies, motorcycles, scooters, ships, boats, jet skis, airplanes, helicopters, trains, trolleys, gondolas, and the like. Other machines included in the definition of "vehicle", as used herein to describe the invention of the present application, and used in conjunction with the present invention, typically may not have a designated space for an operator. Such typical vehicles without a designated space for an operator include, but are not limited to: lawn mowers; farm equipment; any remote-controlled controlled machines, such as for example, cars, planes, helicopters, boats, and motorcycles; and the like.

Furthermore, throughout this disclosure, the term "inside" is used to describe the general position of the device, which transforms light energy into electric current, with respect to a vehicle. As used herein and throughout this disclosure, the term "inside" of a vehicle includes any space that typically may be used for transporting or storing people or goods in a vehicle. As a non-limiting example, the cabin area of a typical vehicle would be considered "inside" of the vehicle as used in this disclosure. Typical advantages of a device being "inside" of a vehicle include, but are not limited to, prevention of the device from being stolen, or from being damaged by external forces, such as inclement weather. Moreover, "inside" of the vehicle would also cover incorporating the device into an integral component of the vehicle, such as, for example, a visor, dashboard, back shelf, hood, trunk, doors, lights, or the like.

Additionally, throughout this disclosure, the term "outside" is used to describe the general position of the device, which transforms light energy into electric current, with respect to a vehicle. As used herein and throughout this disclosure, the term "outside" of a vehicle includes any space that typically may not be used for transporting or storing people or goods in a vehicle. An area that is "outside" of the vehicle is mutually exclusive from an area "inside" of the vehicle. As a non-limiting example, a car cover is outside of the vehicle. Typical advantages of having a device be "outside" of a vehicle include, but are not limited to, greater dimensions for the device, or not taking up room inside of the vehicle that could be used for other persons or cargo.

The present invention provides a system and method for charging a battery of an electric-powered vehicle given a sufficient light source. Using a light source, such as, but not limited to, for example, light from the sun, the system and method of the present invention promotes the charge of a battery of an electric-powered vehicle. The battery may be charged while the vehicle is stationary, such as, for example, in a parking lot at the work place of its operator, or while the vehicle is parked at the operator's home. The battery also may be charged while the vehicle is in motion. The operator of an electric-powered vehicle may allow the vehicle battery to be charged while the vehicle is parked anywhere there is sufficient light to generate power via power-converting means, such as, for example, a cell. As used throughout this disclosure, a "cell", may be, for example, a device, an apparatus, a contraption, a gadget, or the like that is capable of receiving light from any light source and converting energy received from the light source into electric current, either AC or DC. As just one non-limiting example, photovoltaic cells may be used to transform energy from a light source into electric current. In a non-limiting exemplary embodiment, photovoltaic cells may be used to collect power from available light, such as sunlight, and output current, created from the transformation of light into current, to charge a battery.

Reference will now be made in detail to the present exemplary embodiments of the invention, examples of which are illustrated in the accompanying drawings. Wherever possible, the same reference numbers will be used throughout the drawings to refer to the same or like parts.

In the illustrated embodiment, as depicted in FIG. 1, a system 150 is shown for charging a battery 120 of a vehicle 130 that includes an energy-converting means, such as, for example, a cell 100. The cell 100, as defined above, may be, for example, any device that can transform light energy 142 from a light source 140 that emits a light 141 into electrical current, used to charge the battery 120. One such cell 100 may be, for example, a photovoltaic cell, such as silicon photovoltaic cells, gallium arsenide photovoltaic cells, amorphous silicon photovoltaic cells, cadmium sulfide photovoltaic cells, or other semiconductor photovoltaic cells. However, cell 100 is not limited to photovoltaic cells and may be any type of generator that can transform light energy into DC or AC.

The light source 140 may be any source that emits any natural or artificial light energy, including, for example, but not limited to, the sun, fluorescent light sources, incandescent light sources, flames, reflections, lasers, and the like.

The light 141 emitted by the light source 140 may generally light the surrounding of the light source 140, such as, for example, a conventional light bulb. Alternatively, the light source 140 may be concentrated to direct the light in a given light path, such as by flood lights or lasers.

The light energy 142 detected by the cell 100 may have been generated as a result of light 141 from a single light source 140 or multiple light sources of the same or different types, as described above. The light energy may be continuous, such as from a continuous light 141 from a light source 140, or it may be discontinuous, as from a flickering or flashing light 141 from a flickering or flashing light source 140.

The energy-transforming cell 100 is in communication with a battery 120, typically through one or more current carrying means or devices, such as electrical connectors 110, 117. The connectors 110, 177 may be, for example, but not limited to, electrical wires or cables. A switch 111 may be positioned between the cell 100 and the battery 120 to allow means to control current flow from the cell 100 to the battery 120, such as, for example, through use of a conventional on/off switch. Alternatively, the switch 111 may be used to vary the magnitude of current that travels between the cell 100 and the battery 120, giving more control to an operator with regard to the time period required and rate of charge of the battery 120. Such a means for variable current control may be through, for example, a conventional current-limiting switch. Such a current-limiting switch may be beneficial when a pre-set current transferring rate may be too high, for example, damaging, for a given battery.

Alternatively, switch 111 may be a permanent or semi-permanent receiving component of the vehicle 130 that is specifically designed to receive a connector 110. A non-limiting example of a semi-permanent receiving component may be a removable plug, such as, for example, a weather-proof quick-connect plug. Typically, any type of suitable rubber jacketed male-female plug may be used. In a vehicle 130 having a permanent receiving component 111, a second electrical current carrier 117, in addition to the first electrical current carrier 110, may permanently connect the vehicle battery 120 to the receiving component 111. The second current carrier 117 may be constructed from the same material as the first carrier 110, and may be, for example, a wire or cable. The two cables 110 and 117 may be connected through the plug 111 and the system 150 connected to the vehicle 130 in seconds. This provides for easy installation and removal of the system 150 without the inconvenience of connecting all the wires, for example, by going under a hood of a vehicle. When the receiving component is permanent, an existing component of the vehicle 130 may be used, such as, for example, a common cigarette lighter adapter or other electrical outlet that is capable of charging the battery 120 when a current is input into the outlet.

The connection between the cable 117 and the battery 120 may be a connection area 121 that allows the cable 117 to electrically connect with interior components of the battery 120. This connection area 121 may be directly on the surface of the battery 120, such as, for example, posts on a battery. However, the connection area 121 may also be interior of the battery 120.

The cell 100 is connected through the cable 117 to the vehicle 130 through a vehicle connection point 131. The connection point 131 may be any point where the cable 117 may physically enter or connect to a frame or physical structure of the vehicle. For example, the connection point 131 may be, for example, an opening in the body of the vehicle 130 to allow the cable 117 to gain access to the battery 120. Alternatively, the connection point 131 may be a pre-designated position, such as, for example, a slot, in the body of the vehicle 130 that enables the connector 110 to communicate with a pre-designated wiring system (not shown) of the vehicle 130. When the pre-designated wiring system of the vehicle 130 connects to the battery 120, it eliminates the need to physically connect the charging system 150 directly to the battery 120. Such an example of the latter connection point 131 may be, for example, an electrical socket slot that connects with the battery 120 of the vehicle 130, such as, for example, a cigarette lighter slot.

Figure 2:
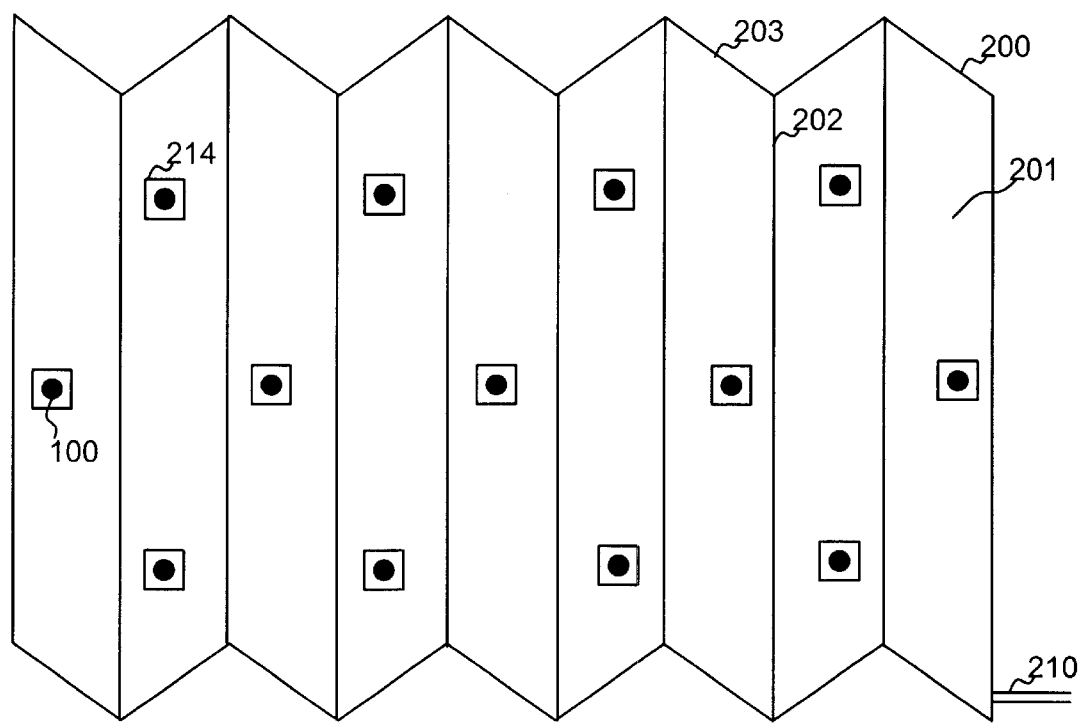
FIG. 2 is a light-facing side of an exemplary embodiment of the invention in the form of a conventional vehicle sunshade.

The system 150 may be implemented on a number of cell support means, such as, for example, portable platforms. One exemplary embodiment of a platform placed inside of a vehicle is a conventional sunshade, typically placed inside the front windshield or other window of a vehicle to block out the radiation effects of the sun, maintain a cooler interior of the vehicle, and preserve the interior materials from fading and cracking. FIG. 2 depicts such a sunshade 200. A conventional sunshade 200 typically has a number of creases 202 that enable the sunshade to easily fold into a substantially flat configuration for ease of handling and storing while not in use. The sunshade 200 may have a number of panels 203 separated by the creases 202. The panels 203 may be of substantially equal dimensions and are folded on top of each other when the sunshade is folded, in an accordion-like fashion.

In an exemplary embodiment of the invention, a sunshade 200 is depicted having one or more energy transforming cells 100 that are positioned so that their light-receiving sides are adjacent a designated front side 201 of the sunshade 200. Each cell 100 may be covered by a protective sheet 214, which will be described in more detail below.

The sunshade 200 also may have a back side 202, which is opposite the front side 201. The back side 202 may support one or more electrical connectors 213, which may be, for example, electrical conducting wires or cables, that lead into an output connector 210, which may be the same as cable 110, or electrically connected to cable 110. Output connector 210 may carry a sum current to the battery 120 created by all the currents generated by each cell 100 and delivered to the output connector 210 via individual wires 213. The output connector 210 may be attached to a convenient corner or side of the sunshade 200. All connectors 110, 117, 210, 213 may be attached to adjacent structures through suitable attaching means, such as, for example, glue, epoxy, tape, fasteners, snaps, pins, or the like. For example, wires 213 may be attached to the back 202 of the sun shade 200 through a suitable attaching means, such as by, for example, epoxy. Care must be taken to ensure that the attaching means does not interfere with the function of the connectors.

Figure 4:
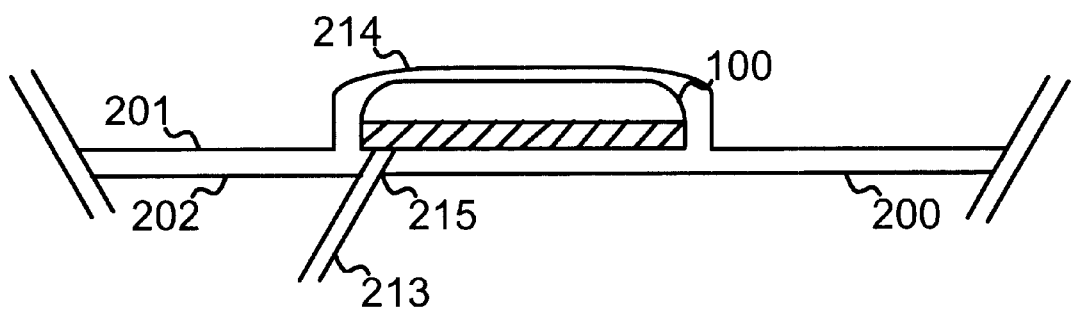
FIG. 4 is an exemplary embodiment of a cell chamber wherein a light-transforming transforming cell 100 is housed in conjunction with one embodiment of this invention.

The cell 100 may be attached to the front side 201 of the sunshade 200, as depicted in FIG. 4. The cell 100 typically attaches to the front side 201 by suitable attaching means, such as those described above, such as for attaching the wires 213 to the back 202 of the sunshade 200. Alternatively, the cell 100 may be supported by the sunshade 100 by being partially inserted into the body of the sunshade 200 by a supporting hole (not shown). In the alternative embodiment using a supporting hole, a friction fit may be sufficient to promote support of the cell 100 onto the sunshade 200. Furthermore, care must be taken to ensure that the attaching means for attaching the cell 100 to the sunshade 200 does not adversely affect the function or integrity of the cell 100 or sun shade 200.

An opening, such as a hole, 215 in the sun shade 200, typically large enough to pass the wire 213 therethrough, passes from the cell 100 on the front side 201 to the back side 202 of the sun shade 200. A protective cover 214, such as a sheet, may be used to protect the cell 100 from external elements that may cause damage to the cell 100. For example, the protective sheet 214 may protect against damage from dust, debris, moisture, liquids, and the like, that may cause damage to the cell 100 if allowed to be in contact with the cell 100. Furthermore, the protective sheet 214 further promotes the stable positioning of the cell 100 on the surface of the sunshade 200. The protective sheet 214 may be a material that is translucent to let light therethrough to the cell 100 and relatively sturdy to protect the cell 100 from external contaminants, as listed above. Exemplary protective sheets may be composed of, for example, a clear glass or plastic, preferably a material that is transparent in the near-infrared, visible, and near-LW regions of the spectrum. The edges of the protective sheet 214 may be secured to the sun shade 200 through conventional securing means known in the art, such as, for example, adherent, tape, staple, clip, fastener, or the like.

Figure 3:
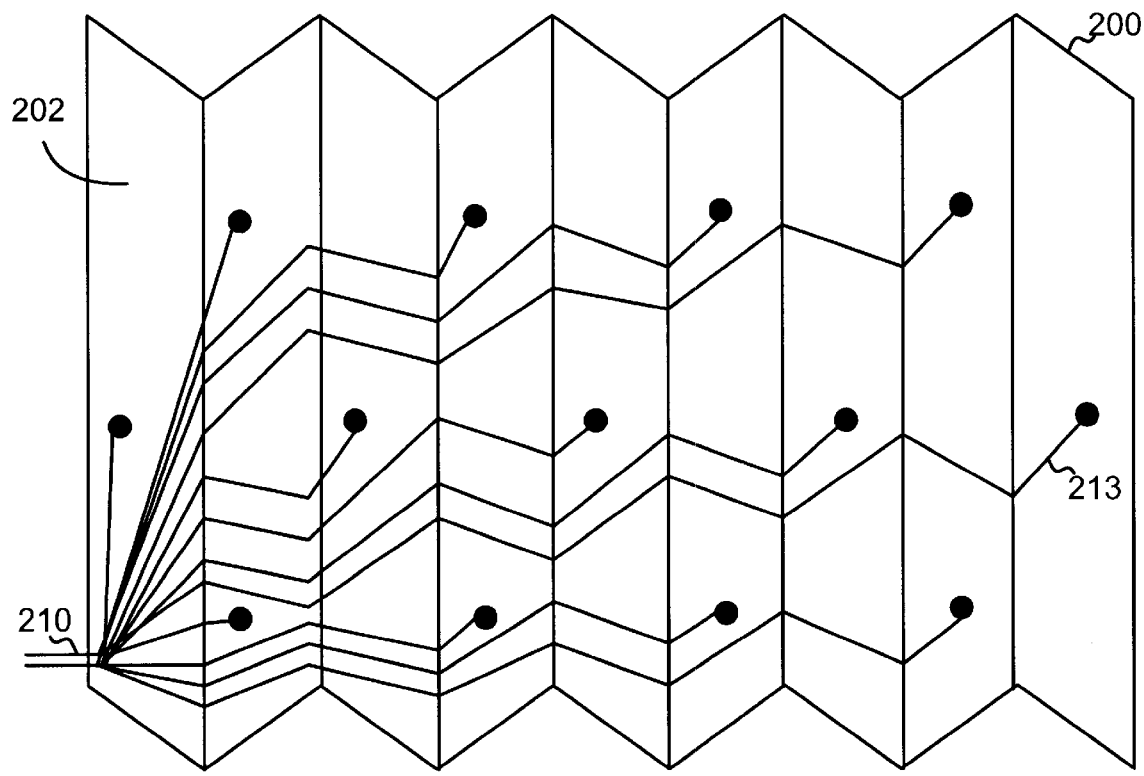
FIG. 3 is the opposite side of the exemplary embodiment depicted in FIG. 2.

The exemplary embodiment of this invention in the form of a sunshade 200 described above and depicted in FIGS. 2–4 is only one example of the implementation of the present invention and is not intended to be limiting. The conventional sunshade is a suitable support structure for the device of the present invention because it is universally available and easy to position within a vehicle to be exposed to maximum sunlight. However, the present invention may be used with any vehicle, as defined above, and attached to any suitable material associated with the vehicle that is capable of supporting the invention and wherein the cells 100 are exposed to light energy.

Figure 5:
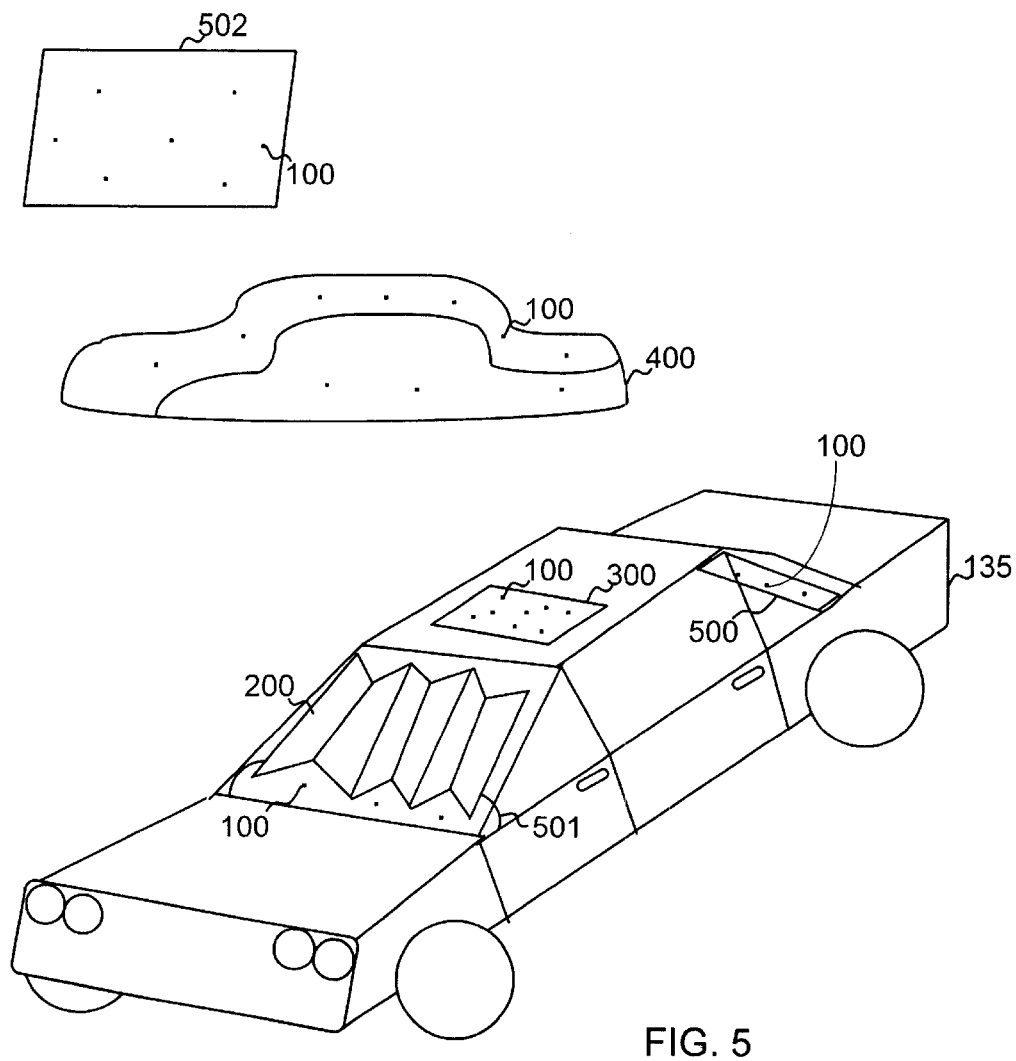
FIG. 5 is a side perspective view of a vehicle showing examples of exemplary embodiments of this invention.

The exemplary embodiment described above was used in conjunction with a conventional, lightweight, and portable device, placed inside of a vehicle, such as a sunshade 200, to promote ease in understanding the invention as a recharge system 150. However, the recharge system 150 also may be used in conjunction with other cell support means, such as, for example, conventional, lightweight, and portable devices, placed on the outside of a vehicle, such as a conventional vehicle cover 400, such as for an automobile 135, as depicted in FIG. 5. An advantage of incorporating the recharge system 150 of the invention with a support structure that is outside of a vehicle, such as a vehicle cover 400, is that there is a greater surface area to enable larger numbers of cells 100 to be supported thereon. Furthermore, the cover 400 also can keep the entire automobile 135 cool by protecting the vehicle's exterior finish and interior material from heat-generating light, for example, from the sun. The sunshade 200, positioned inside of a vehicle, and the cover 400, positioned outside of a vehicle, are exemplary embodiments of the system 150 of the present invention being incorporated into temporary devices that are not typically permanently part of a vehicle, typically are portable, lightweight, relatively inexpensive, and conventional. Thus, an owner of an electric-powered vehicle may be able to purchase such temporary devices having a system 150 incorporated therein from stores that typically sell such after-market devices.

There may be persons who would want to have the system 150 of the present invention already permanently incorporated into an electric-powered vehicle, also considered "inside" of the vehicle as defined above, electing not to buy such a system through the after-market. Thus, alternatively, the recharge system 150 of the invention may be made part of a cell support means that is a relatively fixed component of a vehicle, such as the automobile 135 depicted in FIG. 5. Examples of such relatively fixed components include, but are not limited to: a conventional sun/moon roof (and/or sun/moon roof sliding shield, which is typically positioned between the glass and an operator) 300; a back shelf 500 just inside a back windshield of a vehicle 135; a front dashboard area 501 just inside the front windshield; or along any sides and typically out of driver or passenger eyesight of glass panes of windshield, side, or quarter windows, within a holding structure of clear signal or other lights of the vehicle; or the like. An advantage of the recharge systems 150 built into relatively fixed components of a vehicle is that any wiring used for the system will be hidden from view and thereby less prone to damage or theft. Such recharge systems 150 pre-integrated into fixed components of a vehicle may be optional or standard equipment on new vehicles.

In a further embodiment, the system 150 of the present invention may be incorporated into a permanently-fixed device 502 outside of the vehicle and not integral with the vehicle. For example, it may be desirable to have the system 150 be part of a roof or wall of a building structure that is in proximity to an electric-powered vehicle, but not in, on, or part of the vehicle. Thus, whenever the vehicle is parked at, in, or near such permanently-fixed devices 502, an operator need only connect a suitable connector, such as cable 210 from the device 502 to the vehicle 135. Garage roofs and doors are suitable examples of such a permanently-fixed device 502.

In another exemplary embodiment of the present invention, a method is disclosed for charging a chargeable battery 120 of an electric-powered vehicle 130 using light energy 142. An energy-transforming cell 100, that is supported on a supporting structure positioned either inside or outside of the vehicle 130, and that can convert light energy 142 received from a light source 140 into electrical current, is exposed to a such a light source 140. Upon exposure to the light energy 142, the cell 100 is induced to create electric current. The electric current is communicated with the battery 120 using one or more, connectors, such connectors 110, 117, thereby charging the battery. Upon satisfactory charge of the battery 120, the cell 100 may be disconnected from the battery 120 by, for example, opening a switch 111, described above, located in the connector line.

It will be apparent to those skilled in the art that various modifications and variations can be made in the systems and methods of the present invention and in construction of this system without departing form the scope and spirit of the invention. As an example, the support material on which one or more transformer cells 100 are connected thereto may be electrically positioned to trap light energy upon turning off of a vehicle, for example, by vertically moving panels that are positioned interior of the side glass windows and are vertically movable to block sunlight, hide any valuables inside the vehicle from outside view, and as described by this invention, trap light energy to charge the battery. Furthermore, the number of cells 100 on a particular supporting material or device, such as the exemplary embodiment depicting a sunshade 200, may be varied, with a greater number of cells 100 typically producing a quicker charge rate for a battery 120, but also increasing the cost and components of the device on which the system 150 resides. Thus, the number of cells 100 that should be used on a particular support structure may be determined by weighing the desire for higher charge rates versus costs associated with increased number of cells 100. If a vehicle is typically parked in places where there is lower available light to produce light energy, a support structure for the cells 100 having a higher number of cells 100 is more practical.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for charging a battery of an electric-powered vehicle, comprising:
    a plurality of photovoltaic cells that can convert light energy received from a light source into electrical current, the cells being covered by protective translucent covers;
    a sunshade for supporting the plurality of cells on a front side thereof, wherein the sunshade is positioned inside the vehicle such that the cells supported thereon can receive sufficient light to produce electrical current, each photovoltaic cell having a corresponding electrical connection on a back side of the sunshade leading to an electrical connector; and
    an electrical connector for communicating electrical current from the cell with a chargeable battery of an electric-powered vehicle;
    wherein the chargeable battery is charged when the cell coverts light incident upon the cell into electrical current, which is provided to the chargeable battery through the electrical connector.

2. A system for charging a battery of an electric-powered vehicle, comprising:
    an energy-transforming cell that can convert light energy received from a light source into electrical current;
    a material support for supporting the cell, wherein the material support is positioned inside the vehicle such that the cell supported thereon can receive sufficient light to produce electrical current; and
    a plurality of electrical connectors separated by switches that control a flow of current between the electrical connectors, each electrical connector for communicating electrical current from the cell with a chargeable battery of an electric-powered vehicle;
    wherein the chargeable battery is charged when the cell converts light incident upon the cell into electrical current, which is provided to the chargeable battery through the electrical connector.

3. The system of claim 2, wherein one of the switches comprises a variable current flow switch.

4. The system of claim 2, wherein one of the switches comprises an on/off switch.

5. A system for charging a battery of an electric-powered vehicle, comprising:
    a plurality of photovoltaic cells supported on a side of a vehicle cover, each photovoltaic cell being covered by a protective translucent cover and having a corresponding electrical connection leading to an electrical connector;
    an electrical connector for providing electrical current from the cells to a chargeable battery of an electric-powered vehicle;
    wherein the chargeable battery is charged when light is incident upon the cells and converted into electrical current.

6. A system for charging a battery of an electric-powered vehicle, comprising:
    an energy-transforming cell that can convert light energy received from a light source into electrical current;
    a material support for supporting the cell, wherein the material support is positioned outside the vehicle such that the cell supported thereon can receive sufficient light to produce electrical current;
    a plurality of electrical connectors separated by switches that control a flow of current between the electrical connectors, each electrical connector providing electrical current from the cell to a chargeable battery of an electric-powered vehicle;
    wherein the chargeable battery is charged when light incident upon the cell and converted into electrical current.

7. The system of claim 6, wherein one of the switches comprises a variable current flow switch.

8. The system of claim 6, wherein one of the switches comprises an on/off switch.

9. A system for charging a chargeable battery of an electric-powered vehicle, comprising:
    a plurality of energy-transforming cells that convert light energy received from a light source into electrical current, each cell having an electrical connection for transporting the electrical current out of the cell;
    an electrical connector, connected to the plurality of cells through the plurality of electrical connections, for providing electrical current from the plurality of cells to a chargeable battery of an electric-powered vehicle;
    a sunshade for supporting the plurality of cells;
    wherein the chargeable battery is charged when light is incident upon the cells and converted into electrical current.

10. The system of claim 9, further comprising:
    a translucent sheet positioned on the cells for protecting the cells from contaminants without completely blocking light influx onto the cells.

11. The system of claim 10, wherein the cells comprise photovoltaic cells.

12. The system of claim 11, wherein the photovoltaic cells are covered by a translucent cover to protect the photovoltaic cells.

13. The system of claim 12, wherein a plurality of photovoltaic cells are supported on a front side of the sunshade, each photovoltaic cell having a corresponding electrical connection on a back side of the sunshade leading to the electrical connector.

14. The system of claim 9, wherein the electrical connector comprises a plurality of electrical connectors separated by switches that control a flow of current between the electrical connectors.

15. The system of claim 14, wherein one of the switches comprises a variable current flow switch.

16. The system of claim 14, wherein one of the switches comprises an on/off switch.

17. A system for charging a chargeable battery in an electric-powered vehicle, comprising:
    an electric-powered vehicle having a chargeable battery;
    a plurality of energy-transforming cells that can convert light energy received from a light source into electrical current, each cell having an electrical connection for transporting the electrical current out of the cell;
    an electrical connector, connected to the plurality of cells through the plurality of electrical connections, for communicating electrical current from the plurality of cells with the chargeable battery of the electric-powered vehicle; and
    a material support for supporting the plurality of cells, wherein the material support is positioned inside of the vehicle;

wherein the chargeable battery is charged upon light detected by the cells and converted into electrical current, which is communicated to the chargeable battery through the electrical connector.

18. The system of claim 17, further comprising:
a translucent sheet positioned on the cells for protecting the cells from contaminants without completely blocking light influx onto the cells.

19. The system of claim 17, wherein the material support comprises:
a portable device capable of being reversibly contacted with the vehicle.

20. The system of claim 19, wherein the portable device is a sunshade.

21. The system of claim 17, wherein the material support comprises:
a permanently-fixed device integral to the vehicle.

22. The system of claim 21, wherein the permanently fixed device is a sunroof.

23. The system of claim 21, wherein the permanently fixed device is a dashboard.

24. The system of claim 21, wherein the permanently fixed device is a window.

25. The system of claim 17, wherein the cells comprise photovoltaic cells.

26. The system of claim 25, wherein the photovoltaic cells are covered by a translucent cover to protect the photovoltaic cells.

27. The system of claim 26, wherein a plurality of photovoltaic cells are supported on a front side of a sunshade, each photovoltaic cell having a corresponding electrical connection on a back side of the sunshade leading to the electrical connector.

28. The system of claim 17, wherein the electrical connector comprises a plurality of electrical connectors separated by switches that control a flow of current between the electrical connectors.

29. The system of claim 28, wherein one of the switches comprises a variable current flow switch.

30. The system of claim 28, wherein one of the switches comprises an on/off switch.

31. A system for charging a chargeable battery in an electric-powered vehicle, comprising:
an electric-powered vehicle having a chargeable battery;
a plurality of energy-transforming cells that can convert light energy received from a light source into electrical current, each cell having an electrical connection for transporting the electrical current out of the cell;
an electrical connector, connected to the plurality of cells through the plurality of electrical connections, for communicating electrical current from the plurality of cells with the chargeable battery of the electric-powered vehicle; and
a material support for supporting the plurality of cells, wherein the material support is positioned outside of the vehicle;
wherein the chargeable battery is charged when light is incident on the cells and converted into electrical current, which is communicated to the chargeable battery through the electrical connector.

32. The system of claim 31, further comprising:
a translucent sheet positioned on the cells for protecting the cells from contaminants without completely blocking light influx onto the cells.

33. The system of claim 31, wherein the material support comprises:
a portable device capable of being reversibly contacted with the vehicle.

34. The system of claim 33, wherein the portable device is a vehicle cover.

35. The system of claim 31, wherein the cells comprise photovoltaic cells.

36. The system of claim 35, wherein the photovoltaic cells are covered by a translucent cover to protect the photovoltaic cells.

37. The system of claim 36, wherein a plurality of photovoltaic cells are supported on a side of a vehicle cover, each photovoltaic cell having a corresponding electrical connection leading to the electrical connector.

38. The system of claim 31, wherein the electrical connector comprises a plurality of electrical connectors separated by switches that control a flow of current between the electrical connectors.

39. The system of claim 38, wherein one of the switches comprises a variable current flow switch.

40. The system of claim 38, wherein one of the switches comprises an on/off switch.

41. The system of claim 31, wherein the material support comprises:
a permanently-fixed device separate from the vehicle.

42. The system of claim 41, wherein the permanently fixed device is a wall of a building.

43. The system of claim 41, wherein the permanently fixed device is a roof of a building.

44. A method of charging a battery of an electric vehicle, comprising:
providing an electric-powered vehicle having a chargeable battery, the vehicle further having a battery charging system comprising:
an energy-transforming cell that can convert light energy received from a light source into electrical current;
a material support for supporting the cell, the material support being positioned outside of the vehicle;
an electrical connector for communicating electrical current from the cell with the chargeable battery; and
a switch for controlling the electrical current between the cell and the battery;
exposing the cell to a light source; and
activating the switch to allow current from the cell to travel to the battery and thereby charge the battery.

45. The method of claim 44, further comprising:
de-activating the switch, upon full charge of the battery, thereby preventing current from the cell to reach the battery.

46. The method of claim 45, wherein the switch allows for variable current flow therethrough.

47. The method of claim 45, wherein the switch is an on/off switch.

* * * * *